United States Patent [19]

Stoffels

[11] 3,933,347

[45] Jan. 20, 1976

[54] AIR CHUCK AND MANDREL FOR ROLL SLITTING MACHINE

[75] Inventor: Carl A. Stoffels, Flemington, N.J.

[73] Assignee: Judelshon Industries, Inc., Jersey City, N.J.

[22] Filed: June 11, 1974

[21] Appl. No.: 468,340

[52] U.S. Cl.................... 269/31; 82/40 R; 82/101; 269/48.1; 279/4
[51] Int. Cl.².......................................... B23Q 3/14
[58] Field of Search ......... 82/40 R, 43, 44, 45, 101, 82/DIG. 6; 269/25, 30, 31, 32, 48.1, 55; 279/2 A, 4, 106

[56] References Cited
UNITED STATES PATENTS

| | | |
|---|---|---|
| 2,337,274 | 12/1943 | Ruf ....................................... 82/101 |
| 2,667,356 | 1/1954 | Forward ............................. 279/106 |
| 3,145,997 | 8/1964 | Moses .................................. 279/2 A |
| 3,776,070 | 12/1973 | Stoffels ................................ 82/101 |

Primary Examiner—Roy Lake
Assistant Examiner—Mark S. Bicks
Attorney, Agent, or Firm—Amster & Rothstein

[57] ABSTRACT

An improved roll slitting machine of the type used to slit wide rolls of material into narrow width rolls or ribbons includes an air chuck having gripping jaws which are actuated through multiple fluid logic paths to grip the roll of material for rotation about a changeable stationary mandrel. One end of the mandrel is supported by the machine frame and the opposite end is supported for quick release in the chuck.

11 Claims, 11 Drawing Figures

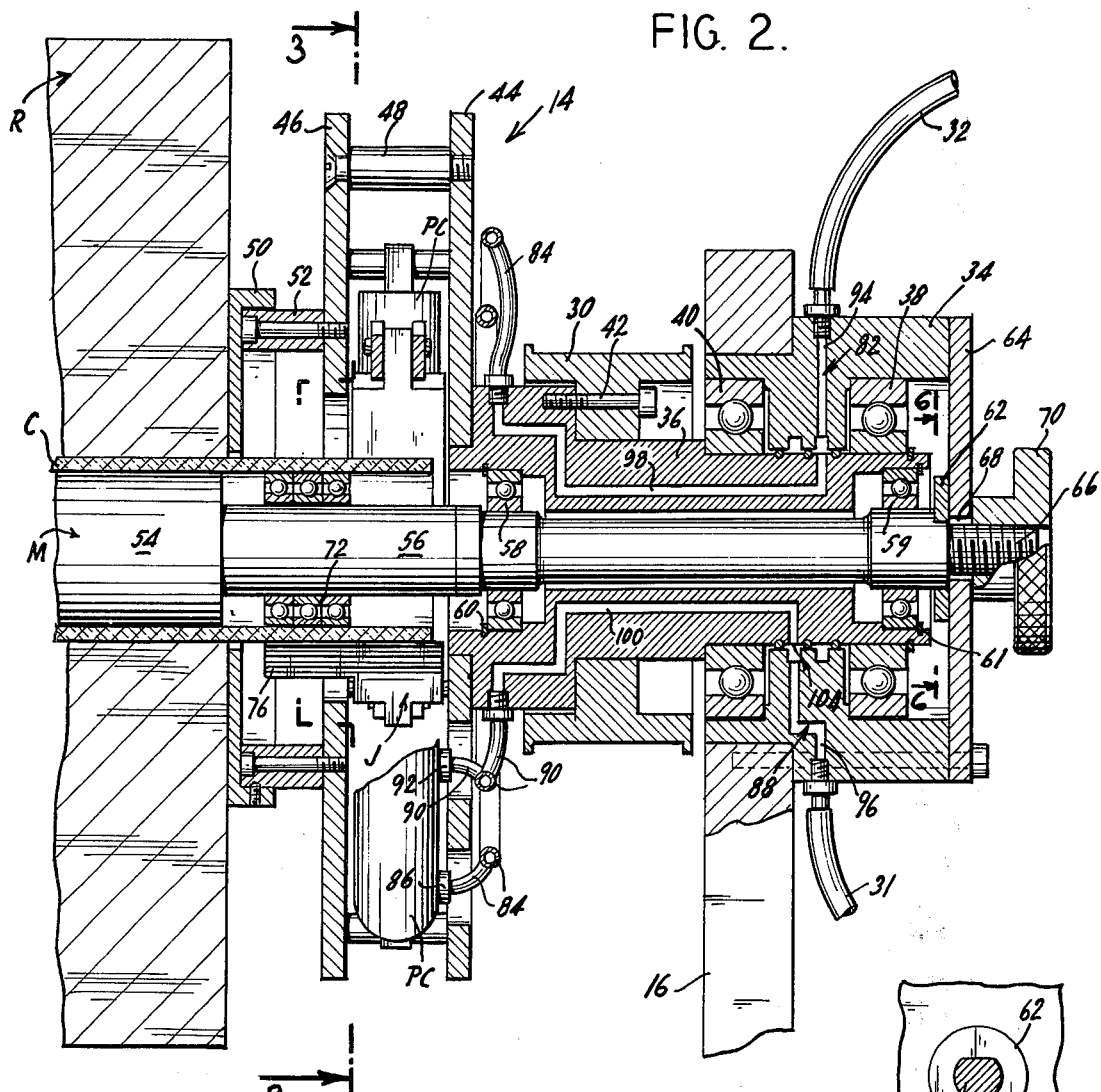
FIG. 2.
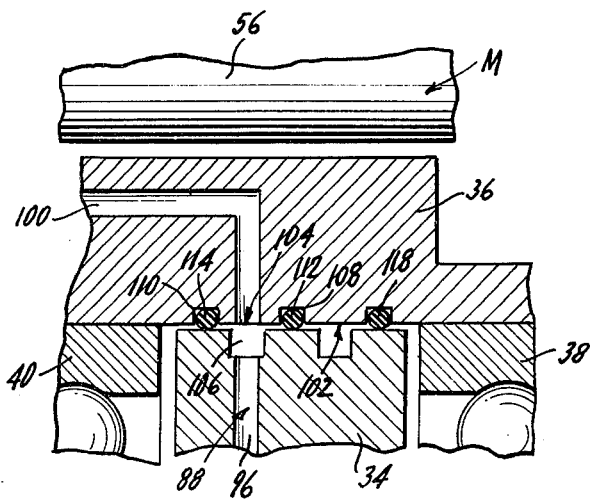
FIG. 5.
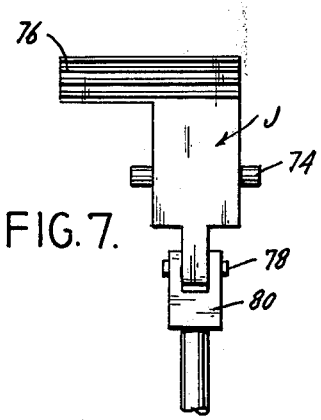
FIG. 6.
FIG. 7.

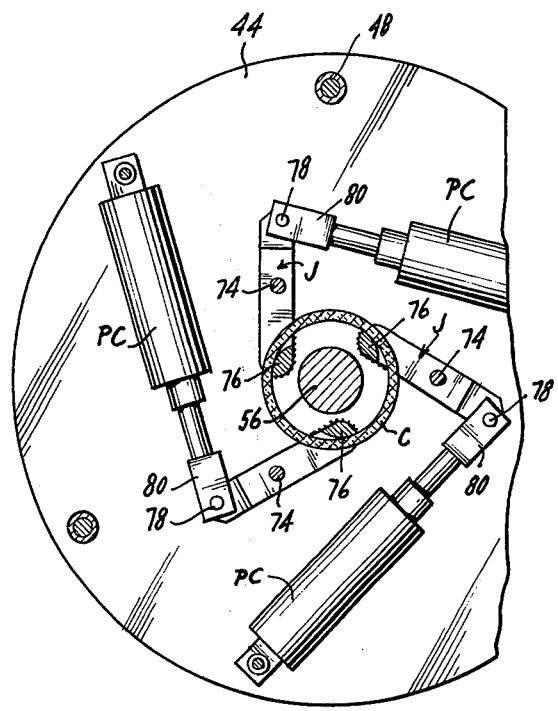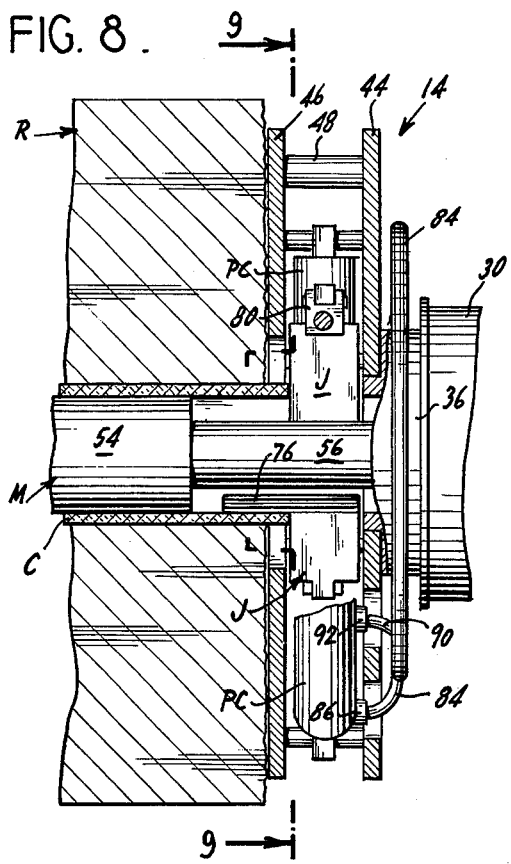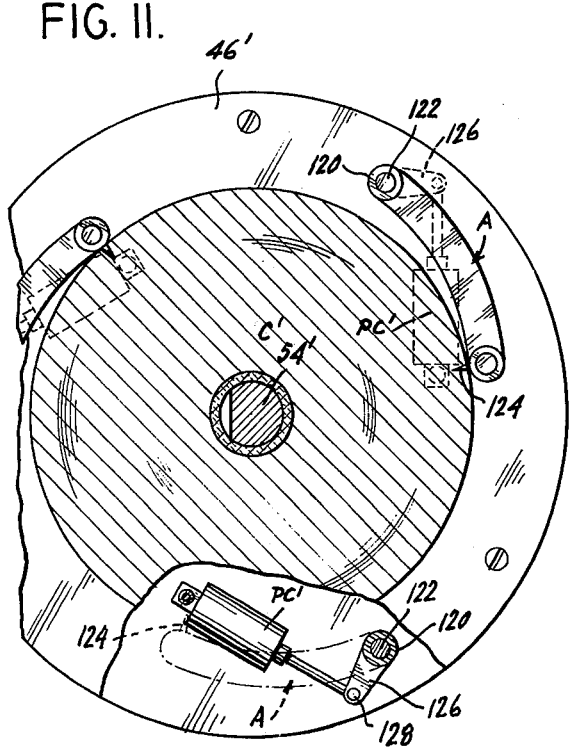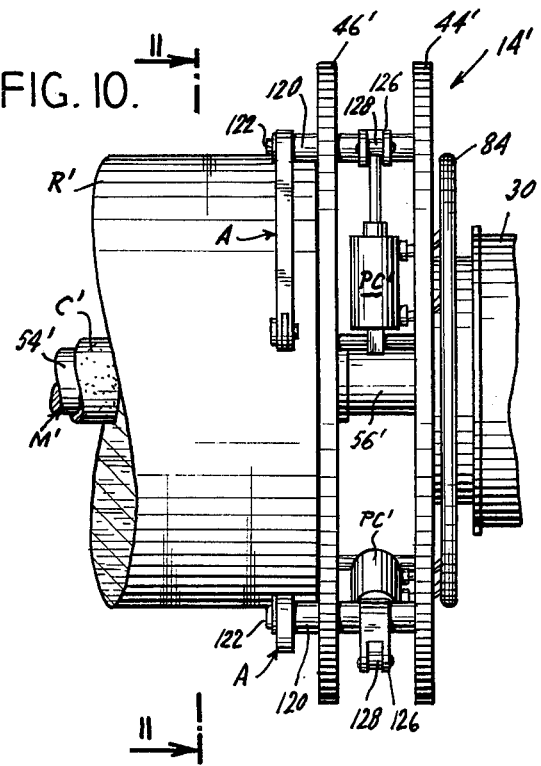

AIR CHUCK AND MANDREL FOR ROLL SLITTING MACHINE

The present invention relates generally to machinery for use in the fabric and film industries in which wide widths of material rolled upon central core, typically cardboard, are slit into ribbons or narrower rolls. Such machines are commonly referred to as single knife cutters and they generally comprise a stationary mandrel mounted on the machine which supports the roll of material and means to rotate the roll of material about the stationary mandrel while simultaneously advancing a rotating circular knife blade radially into the roll. The knife is moved through the material on the roll and then through the core to slit the roll. The knife is moved through the material on the roll and then through the core to slit the roll. The blade is then moved to another location along the length of the roll to form the next desired slit.

Among the problems which have existed in machines of this type is the difficulty and inconvenience of gripping the roll of material for rotation during the slitting operation. Typically, the chucking operation has been performed by mechanical chucks which engage either the periphery or the core of the roll of material in a typical clamping operation. While such chucks have been used for many years, they have demonstrated significant failings in that their use is often restricted by the type and condition of the roll of material which is to be engaged, they are relatively difficult to use, they take more time than is necessary to engage and disengage them, and they have been known, on too many occasions, to damage the material and/or the ends of the core.

A further problem which has existed in machines of this type is the difficulty in supporting rolls of material having different core diameters. Since a mandrel can only be used to support a roll of material having an internal core diameter substantially complementary to the diameter of the mandrel, the mandrel must often be changed to accommodate different rolls of material. This operation is typically time consuming and difficult causing large amounts of time during which the machine cannot be in use and creating scheduling problems for the machine operators.

In general, it is an object of the present invention to provide a single knife slitting machine which improves the performance which was available in the prior art and obviates one or more of the above stated disadvantages.

Specifically, it is an object of the present invention to provide an air chuck for such a machine which can be operated quickly and efficiently, upon the simple application of appropriate pneumatic pressure, to engage or disengage a roll of material such that upon rotation of the chuck, the roll of material will be rotated about its own axis.

It is a still further object of the present invention to provide an air chuck which can be operated to engage different portions of the roll of material. Specifically, it is an object of the invention to provide an air chuck which can grip the inside or outside surface of the core or the periphery of the roll of material, or to simultaneously grip the core and periphery of the roll of material.

It is a still further object of the invention to provide such an air chuck with multiple fluid operating paths for controlling the operation of the chuck.

It is a still further object of the invention to provide a mandrel for such a machine which is supported in the air chuck and which can be quickly and easily changed so that rolls of the material having various core diameters can be readily mounted on the machine.

In accordance with one illustrative example of the present invention, there is provided an improved single knife slitting machine. The slitting machine includes a stationary mandrel which is mounted, at one end, on a mounting mechanism on the frame of the machine and on the other end in an air chuck. The air chuck is arranged to engage a roll of material fitted coaxially about the stationary mandrel and when so engaged is driven by conventional drive means to rotate a roll of material. A carriage is mounted for movement, parallel, to the mandrel, to different cutting positions along the length of the roll of material. A power driven circular knife blade is mounted on the carriage for movement in a plane perpendicular to the axis of the mandrel to make periodic slicing cuts into the roll of material and core. The chuck includes a stationary member coaxial with the mandrel and mounted to the frame of the machine and a coaxial rotatable member supported by bearing means in the stationary chuck member for rotation about its axis. One end of the mandrel is supported by bearing means in the rotatable chuck member, which provides free rotation of the rotatable chuck body member about the mandrel, and by locking means on the stationary chuck body member which engages the end of the mandrel for quick release of the mandrel from the chuck. Mounted coaxially for rotation with the rotatable chuck body member and in a position to engage the roll of material are a plurality of chuck jaws which move between a gripping position in which they engage the roll of material and a release position in which the roll of material can be removed from the mandrel. Multiple fluid logic or air paths are provided which direct air from an air pressure supply source, through a rotational air coupling between the stationary and rotatable chuck body members, to appropriate piston and cylinder assemblies which control the gripping jaws to move between their release and gripping positions.

To slit a roll of material on the machine, a properly sized mandrel is selected and positioned in the machine with one end supported by the bearing means in the rotatable chuck body member and the locking means in the stationary chuck body member and the other end supported by the machine frame. A roll of material is fitted coaxially on the mandrel. Air from the air source passes through one of the air paths to quickly energize the chuck jaws to move the jaws to the gripping position where they securely engage the roll of material. Drive means drives the rotatable chuck member which rotates the roll of material about the stationary mandrel while simultaneously the rotating knife blade is driven into and out of the roll of material to cut the roll into smaller rolls or ribbons of predetermined widths. When the roll of material has been cut as desired, the drive means are disengaged and air from the air source is passed through another of the air paths to the piston and cylinder assemblies or pressure is withdrawn from those assemblies to quickly disengage the chuck jaws from the material. The individual widths of material are then removed from the mandrel and the machine is ready for slitting another roll of material. If the next roll of material has a different diameter core than the previously cut roll and requires a different sized mandrel, the original mandrel is removed by simply releasing the locking means securing the mandrel to the stationary chuck body, sliding the mandrel out of the chuck, and sliding a new mandrel into the chuck and locking it into the machine.

The multiple fluid logic paths provide for a wide variation in the control and arrangement of the chuck jaws on the chuck. Thus, without any modification to the chuck, the jaws can be operated to grip either the inside or outside surface of the core so that rolls of material having different lengths of core can readily be cut on the machine. The multiple fluid logic paths also permit control of two or more sets of chuck jaws which can be arranged to simultaneously engage two or more portions of the roll of material.

The above brief description, as well as further other objects, features and advantages of the present invention, will be best understood by reference to the following detailed description of the invention, when taken in conjunction with the accompanying drawings wherein:

FIG. 2 is a sectional view of one illustrative embodiment of the present invention taken along the line 2—2 of FIG. 1 and locking in the direction of the arrows and showing the interconnection between the air chuck and the frame of the machine, a stationary mandrel and a roll of material;

FIG. 5 is an enlarged, detailed view of a portion of FIG. 2 showing the air coupling between the rotatable and stationary chuck body members;

FIG. 6 is a sectional view taken along the line 6—6 of FIG. 2 and looking in the direction of the arrows and showing a keying arrangement for insuring proper orientation of the mandrel in the chuck;

FIG. 7 is an enlarged, detailed view showing one of the chuck jaws which engage the surface of the core of the roll of material;

FIG. 8 is a sectional view of another illustrative embodiment of the invention showing the interconnection between the air chuck and the frame of a machine, a stationary mandrel and a roll of material;

FIG. 9 is a sectional view taken along the lines 9—9 of FIG. 8 and looking in the direction of the arrows and showing the chuck jaws engaging the inside surface of the core;

FIG. 10 is a sectional view of another illustrative embodiment of the invention showing the interconnection between the air chuck and the frame of a machine, a stationary mandrel and a roll of material;

FIG. 11 is a sectional view, partially broken away, taken along the lines 11—11 of FIG. 10 and looking in the direction of the arrows and showing the chuck jaws arranged to engage the periphery of the roll of material.

Figure 1:
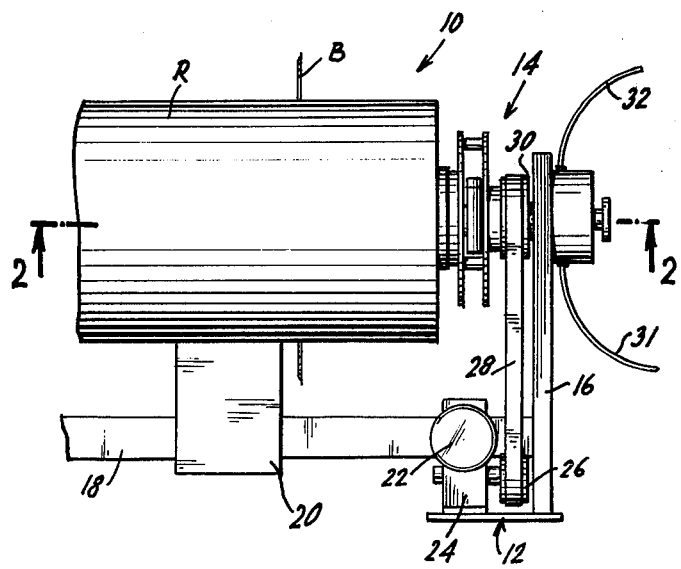
FIG. 1 is a front elevation view of a portion of a single knife cutting machine incorporating the present invention.

Referring to FIG. 1, there is shown a partial view of a roll slitting machine generally designated by numeral 10. The machine 10 generally comprises a frame 12 having an air chuck 14 supported on chuck mounting arm 16 secured to the frame. Track 18 which runs the length of the machine supports a carriage 20 on which is mounted a blade B and appropriate means to rotate the blade and move it radially into the roll of material R. A motor 22 is provided which drives a gear reduction unit 24, the output of which is connected to a pulley 26 which drives belt 28, which then drives a second pulley 30 which is connected to the air chuck 14 as will be described in greater detail below. Air lines 31, 32 are also connected to the air chuck 14 and their function will also be described in greater detail below.

The air chuck 14, in accordance with the present invention, provides two functions, the first being to engage the roll of material R to drive it through its rotational movement about its own axis and the second being to provide support for one end of a stationary mandrel so that the mandrel can be quickly and easily removed or inserted in the machine. The following description will first be directed to the support functions for the mandrel and thereafter a description will be given of the chucking and driving mechanism.

Referring now to FIG. 2, chuck 14 includes a stationary chuck body member 34, mounted on fixed arm 16 and a rotatable chuck body member 36, coaxially mounted with stationary chuck body member 34 and a pair of ball bearings 38, 40 positioned between the stationary and rotatable chuck body members. Pulley 30 is fixed to chuck member 36, as by screws 42. Mounted on the forward end of the rotatable chuck body member are a pair of discs or plates 44, 46 supported in spaced apart relation by spacers 48 and which have mounted therebetween piston and cylinder assembly, PC which control chuck jaws, J, to grip the outside surface of core, C, of the roll of material as will be described below. Mounted forward of disc 46 is plate 50 spaced from the forward face of disc 46 by spacers 52 to abut the rearward face of roll R.

Supported in chuck 14 is one end of a mandrel, M, the other end of which is supported by the machine frame as is well known in the art, and which, in turn, supports the roll of material. The mandrel has a main body portion 54 having a flat side, not shown, arranged to face the rotating cutting blade and having a diameter substantially equal to the internal diameter of the core, C, and a reduced diameter rear portion 56 supported in rotatable chuck body member 36 by bearings 58, 59 which are retained in member 36 by C-rings 60, 61. As best shown in FIG. 6, the rearward end of mandrel M is cut to form a key which is seated in a similarly shaped hole in plate 62 attached to the inner face of rear plate 64 on stationary chuck member 34, to insure proper orientation of the flat side of mandrel M with respect to the rotating cutting blade when the mandrel is seated in the chuck. Secured to the rearward end of mandrel M is a threaded rod, 66 which extends through hole 68 in rear plate 64 of the stationary chuck body member. Knob 70 having an internal thread engages threaded rod 66 to secure the rearward end of the mandrel to the chuck. It is thus seen that the mandrel can be quickly and easily removed from the chuck by disengaging knob 70 from screw 66 and sliding the entire mandrel forward. Mandrels for this machine can thus be formed with various diameter main portions 54 to support rolls of material having various core diameters, however, all the mandrels are formed with the rear portion 56 having the same dimensions. As will be described in greater detail below, the mandrel has ball bearings 72 mounted on the reduced diameter portion thereof which provides additional internal clamping support for the rearward extension of core C when the core is gripped by the jaws of air chuck 14.

Pivotably mounted between plates 46 and 48 for rotation with rotatable chuck member 36 are chuck jaws, J, which are activated by piston and cylinder assembly PC to engage or grip the outer surface of core C and when so engaged to hold the roll of material for rotation about its axis during the roll slitting operation. The chuck jaws and associated piston and cylinder assembly are best understood by considering FIGS. 2, 3, and 7. Three chuck jaws, J, are pivotably mounted at pivots 74 which are secured between discs 44, 46 at 120° intervals. Each of the chuck jaws, extending from pivot 74 in one direction, terminate in a gripping head 76 which extends parallel to the axis of the slitting machine. Each gripping head is formed with soft rubber or other suitable gripping material which has grooves, also extending axially along the machine, to provide good friction contact with the core C as will be described below. The chuck jaws J extend in the opposite direction from pivot 74 to second pivots 78 which are secured in brackets 80.

The movement of the chuck jaws between the gripping and release position is provided by three piston and cylinder assemblies which are interconnected with the chuck jaws at bracket 80. As can be readily seen in FIG. 3, extension of the pistion and cylinder assembly will rotate chuck jaws J about pivot 74 into the gripping position shown, wherein the gripping head 76 frictionally engages the outer surface of core C to hold the roll of material for rotation. Retraction of the piston and cylinder assembly pivots the chuck jaws about pivot 74 in the opposite direction to bring the jaws to their release position.

Pneumatic force for operating the chuck jaws is provided by multiple air paths connected between a conventional source of air pressure, now shown, and the piston and cylinder assembly PC. Specifically, a first air path for activating the chuck jaws to engage the roll of material is provided by air fed from a source of air pressure through external air line 32 to a first air path or passageway 82, extending through the chuck body, to an air line 84 which distributes the air to appropriate ports 86 of the piston and cylinder assembly to extend the assemblies which rotate the chuck jaws into the gripping position. The second air path for moving the chuck jaws between the gripping position and the release position includes external air line 31 which interconnects with second passageway 88 to deliver air to air line 90 which distributes the air to appropriate ports 92 in the piston and cylinder assembly to retract the assembly thereby pivoting chuck jaws J about pivot 74 for movement to the release position where the chuck jaws no longer engage the core of the material.

Figure 4:
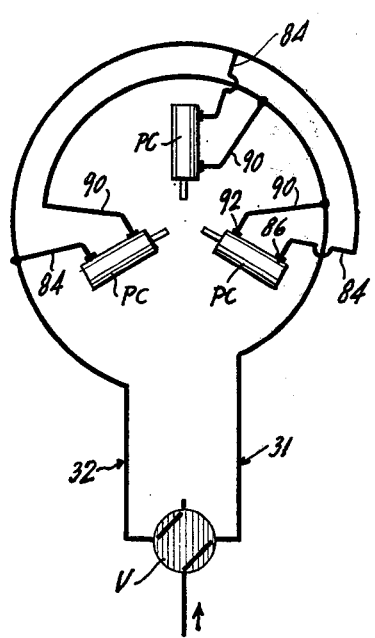
FIG. 4 is a diagrammatic representation of one illustrative example showing multiple air paths for controlling the piston and cylinder assemblies which activate the set of chuck jaws shown in FIG. 3.

The multiple air paths for controlling piston and cylinder assembly PC is shown schematically in FIG. 4. With a control valve, V, in the position shown, air from the air supply is fed through air line 31, air passageway 88 and air line 90 to ports 92 of the piston and cylinder assembly which retracts the assembly thereby moving the chuck jaws from the engage to the release position. To extend the chuck jaws, valve, V, is rotated 90° so that air passes through air line 32, air passageway 82 and air line 84 to ports 86 of the piston and cylinder assembly. Thus it is readily seen, that with multiple air paths, the chuck jaws are actively operated to move between the release and gripping positions to provide quick and effective gripping and release of the roll of material.

Returning to FIG. 2, each of the air passageways 82, 88 includes first sections 94, 96 respectively, extending through the stationary chuck body member, which interconnects with second sections 98, 100, respectively, extending through the rotatable chuck body member, through rotating air couplings 102, 104. Rotating air couplings 102, 104 couple the air between the stationary and rotating chuck body members so that during rotation of the chuck, the chuck jaws are forced into positive engagement with the core. For a better understanding of the construction and operation of the rotating air coupling, refer to FIG. 5 which is an enlarged detailed view of the rotating air coupling 104, and a partial view of coupling 102. As shown, air coupling 104 includes a circumferential groove 106 formed in the surface of stationary chuck body member 34 which is interconnected to receive air from the first section 96 of the air passageway and to distribute air in the groove and which in turn is aligned with the second portion 100 of the air passageway. The rotatable chuck body member 36 is formed with two circumferential grooves, 108, 110, disposed in opposite sides of groove 106 which are seated two O-rings 112, 114 which seal the air coupler. During rotation of chuck member 36, air which is supplied under pressure through passageway 96 is forced around the circumference of member 36 in groove 106 and into passageway 100 since the coupling is sealed by O-rings 112, 114. Rotating coupling 102 shown partially in FIG. 5, operates in the same manner and includes circumferential groove, 116 and O-ring 118 which together with O-ring 112 seal the coupling.

The improved slitting machine may be more completely understood by considering the following description of its operation. A mandrel having a main body diameter which is substantially equal to the internal diameter of the core of material to be slit is selected. Bearings 72 are positioned on the mandrel and the mandrel is mounted on the slitting machine with one end supported on the frame and the opposite end inserted into chuck 14, seated in plate 62 so that the flat side of the mandrel is oriented toward the cutting blade, and locked in place with lock knob 70. A roll of material is inserted over the mandrel with the rearward end abutting the forward face of plate 50 and the core extending rearwardly over ball bearing 72 and through a central cut-out in plate 46. The offset of the roll of material from the forward face of plate 46 can, of course, be changed by varying the length of spacers 52 to accommodate different length cores or the core can be cut to predetermined lengths. With the roll of material in place, air from the air source is passed through line 32 and passageway 82 to activate piston and cylinder assembly PC which moves the chuck jaws from the release position to the engage position wherein the gripping heads 76 frictionally engage the outer surface of the core. Bearings 72 are positioned on the mandrel opposite bearing heads 76 to provide internal bearing support for the core and to permit free rotation of the roll of material about the mandrel. The roll of material is now tightly engaged in the chuck. Upon energization of motor 22, the rotatable chuck body member 36 is driven by the conventional belt and pulley system and the roll of material is rotated about stationary mandrel M. The mandrel is fixed in position since one end is locked in the stationary chuck member, while the rotatable body member is free to rotate since the mandrel is supported by bearings 58, 60 and 72. The roll of material is slit into segments by moving the rotating knife blade R into and through the material and core. Slitting proceeds from the far end of the machine towards the clutch. Upon completion of the slitting operation, the rotation of the clutch is stopped and air is fed from the air supply source through passageway 88 to actively retract the piston and cylinder assembly thereby moving the chuck jaws from the engage to the release position. The segments of the roll are then removed from the mandrel.

What has been described is an improved roll slitting machine for slitting a roll of material which has a core extending sufficiently beyond the face of the material so that the outer surface of the core can be gripped and held for rotation by the chuck jaws. Very often, due to manufacturing methods or core breakage, the core does not extend a sufficient distance beyond the rear face of the roll of material to permit effective engagement of the outer surface of the core by the chuck jaws. When this situation arose in the past, a new chuck had to be installed on the slitting machine, a portion of the rearward end of the material had to be cut off to expose more of the outer surface of the core, or another slitting machine, having an appropriate chucking arrangement had to be used in the slitting operation. In accordance with this invention, a roll of material having a relatively short core can be slit on the same slitting machine as a roll of material having a long core without modifying the machine.

Referring to FIGS. 8 and 9, there is shown a partial sectional view of the roll of material R having a core C extending a relatively short distance rearward of the rearward face of the roll of material supported for rotation about stationary mandrel M by chuck 14. The common elements between FIGS. 8, 9 and FIGS. 1–7 are indicated by the same reference numerals. As shown in FIG. 8, although plate 50 and spacers 52 (see FIG. 2) are removed, the core C does not extend sufficiently rearward of the rearward face of the roll of material to allow gripping heads 76 of chuck jaws J to adequately grip the outer surface of the core for rotation of the roll of material during the slitting operation. However, by utilizing the multiple fluid logic paths which control the operation of the chuck jaws through the piston and cylinder assemblies, the gripping head of the chuck jaws can be positioned to grip the internal surface of the core without modification to the chuck.

Figure 3:
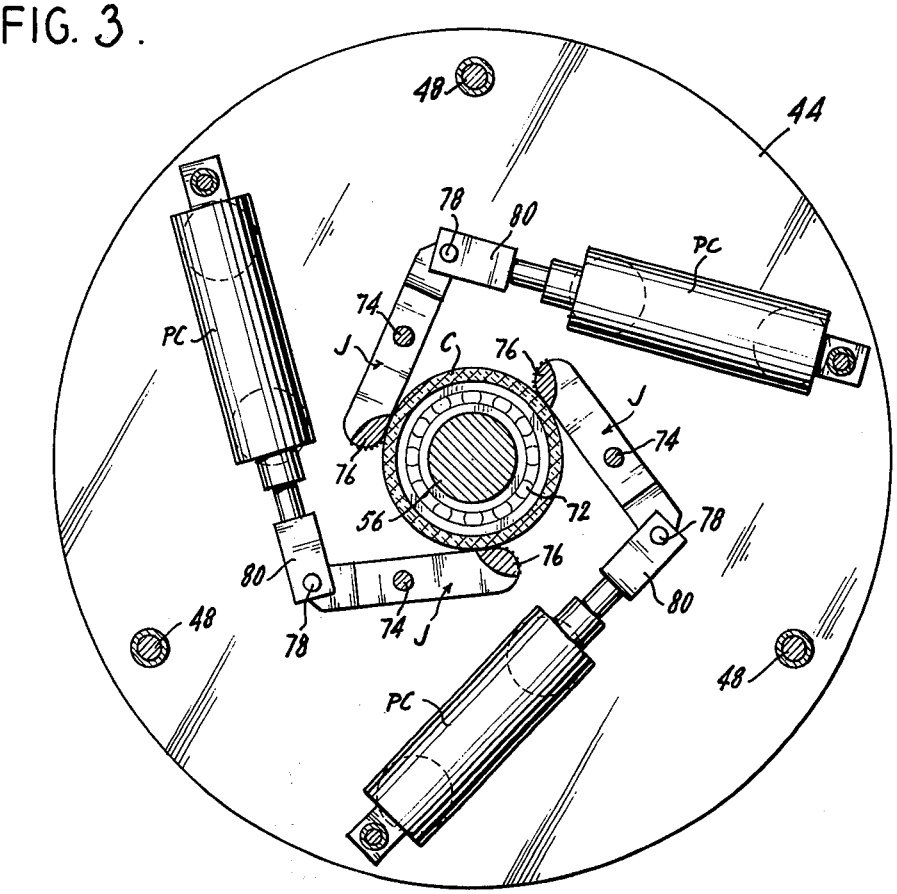
FIG. 3 is a sectional view taken along the lines 3—3 of FIG. 2 and looking in the direction of the arrows and showing the chuck jaws engaging the oustide surface of the core.

This gripping operation can best be understood by reference to FIG. 9, which is similar to FIG. 3. Prior to inserting the roll of material on to the slitting machine, piston and cylinder assembly PC are extended pivoting chuck jaw, J, about pivot 74 until gripping head 76 contacts the mandrel. After the roll of material is inserted on the machine, the piston and cylinder assembly is partially retracted causing the chuck jaws to pivot in the opposite sense about pivot 74 until the gripping heads firmly frictionally engage the inner surface of the core with sufficient force to hold the roll of material for rotation about the stationary mandrel. The multiple air paths arranged in the chuck provide the chuck with the capability of this operation.

To more fully understand the operation of the chucking arrangement shown in FIGS. 8 and 9, this chucking arrangement will now be discussed in greater detail with reference also to FIG. 2. Prior to inserting the roll of material on the mandrel, air is fed from the air source through air passageway 82 to air line 84 which extends the piston and cylinder assembly to pivot the chuck jaws around pivot 74 until the gripping heads 76 are in contact with the mandrel. The roll of material is then slipped over the mandrel and positioned with the rearward face of the roll abutting the forward face of plate 46. Air is then supplied from the air source through air passageway 96, partially retracting the piston and cylinder assembly and pivoting the gripping heads into frictional engagement with the inner surface of the core to hold the core during the slitting operation. After slitting, air is again supplied to the piston and cylinder assembly through air passageway 82 to extend the piston and cylinder assembly, pivoting the gripping heads out of engagement with the core and permitting the removal of the roll of material from the mandrel.

It is often necessary to grip the periphery of the roll of material instead of or in addition to gripping the core during the roll slitting operation. In accordance with this invention, a slitting machine can be readily arranged to grip the periphery of the material. Such an arrangement is shown in detail in FIGS. 10 and 11 where common elements from the previous figures are given like reference numerals. In this embodiment of the invention, the chuck jaws and piston and cylinder assemblies have been modified, as described in greater detail below, so that one air logic path actuates the piston and cylinder assembly to force a spiked gripper attached at the end of the chuck jaw into the material for positive engagement of the roll of material during rotation and slitting and a second air logic path activates the piston and cylinder for positive disengagement of the spiked gripper from the material.

The principle of operation of the chuck for gripping the periphery of the roll of material in accordance with this invention can best be understood by reference to FIG. 11. As shown in FIG. 11, a roll of material R' is inserted over the mandrel. (Note the forward portion 54' of mandrel M' which is D-shaped with the flat portion of the mandrel oriented to face the cutting blade so that the blade can cut all the way through the core.) Arranged around plate 46' (FIG. 10) are chuck arms A which are previously mounted at one end on shaft 120 extending through plates 44' and 46' which is rotatably mounted on inner shaft 122 secured to plates 44' and 46'. Mounted on the opposite end of the chuck arm A is a spiked gripping member 124 which, as will be explained in greater detail below, is arranged to penetrate the surface of the material to firmly hold the material during rotation of the roll of material. Linkage 126, positioned between plates 44' and 46' is secured at one end to shaft 120. Force for controlling chuck jaws J are provided by piston and cylinder assembly PC' positioned between plates 44' and 46' and interconnected with the chuck jaws through pivot 128 on linkage 126. As will now be readily apparent, extension of the piston and cylinder assembly displaces linkage 126 outwardly in the direction of the periphery of plate 46' producing rotation of shaft 120 about shaft 122 and movement of the chuck arms A and spiked gripping member out of engagement with the roll of material. Retraction of the piston and cylinder assembly produces inward displacement of linkage 126 forcing the gripping spike into the material to securely hold the roll of material.

What has been described above and illustrated in the drawings are some examples of a machine which uses the concepts of the present invention. These examples however do not in any way exhaust all possible applications for this invention. For example, any number of air logic paths can be provided to control multiple sets of chuck jaws arranged to engage various portions of the roll of material simultaneously. Thus, one set of chuck jaws can be controlled to grip the outer surface of the core while a second set of chuck jaws can simultaneously grip the periphery of the material. Other variations in the specifics of this machine, both major and minor, can also be made without departing from the spirit and scope of the invention.

What I claim is:

1. In a slitting machine for making radial cuts in a roll of material as said roll is rotated about a stationary mandrel, a fluid actuated chuck for gripping said roll of material, said chuck including a stationary chuck body member mounted in the frame of said machine coaxially with said mandrel, a rotatable chuck body member coaxially mounted within said stationary chuck body member and bearing means therebetween providing free rotation of said rotatable chuck body member with respect to said stationary chuck body member, mandrel mounting means positioned within said chuck to receive one end of the mandrel for supporting said mandrel in a stationary non-rotating manner, chuck jaw means mounted on said rotatable chuck body member for movement between a gripping position in which said jaws engage said roll of material and a release position disengaged from the roll of material, fluid powdered actuation means operatively connected to said chuck jaw means to move said jaws means between the release position and the gripping position, fluid pressure means having multiple fluid paths for controlling said actuating means including for each of said multiple fluid paths coupling means between the rotatable chuck body member and a source of fluid pressure and means providing a fluid passageway between said coupling means and said actuating means for controlling said actuating means, drive means connected to said rotatable chuck body member for actuating a roll of material on the machine mandrel by rotating said rotatable chuck body member and said chuck jaw means when said chuck jaw means are engaged with the roll of material mounted on the mandrel.

2. In a slitting machine for making radial cuts in a roll of material as said roll is rotated about a stationary mandrel, a fluid actuated chuck for gripping said roll of material, said chuck including a stationary chuck body member mounted in the frame of said machine coaxially with said mandrel, a rotatable chuck body member coaxially mounted with said stationary chuck body member and bearing means therebetween providing free rotation of said rotatable chuck body member with respect to said stationary chuck body member, mandrel mounting means positioned within said chuck to receive one end of the mandrel for supporting said mandrel in a stationary non-rotating manner, chuck jaw means mounted on said rotatable chuck body member for movement between a gripping position in which said jaws engage said roll of material and a release position disengaged from the roll of material, fluid powered actuation means operatively connected to said chuck jaw means to move said chuck jaw means between the release and the gripping position, said fluid pressure means having at least two separately controllable fluid paths for controlling separate functions of said actuating means including for each of said fluid paths coupling means between said rotatable chuck body member and said stationary chuck body member, means providing a fluid passageway in said rotatable chuck body member between said coupling means and said actuating means and means providing a fluid passageway in said stationary chuck body member between said coupling means and a source of fluid pressure, drive means connected to said rotatable chuck body member for rotating a roll of material on the machine mandrel by rotating said rotatable chuck body member and said chuck jaw means when said chuck jaw means are engaged with the roll of material on the mandrel.

3. In a slitting machine for making radial cuts in a roll of material as said roll is rotated about its axis the improvement comprising a removable mandrel and a fluid actuated chuck for gripping said roll of material and said mandrel supporting said roll of material as it is rotated, said chuck including a stationary chuck body member mounted in the frame of said machine coaxially with said mandrel, a rotatable chuck body member coaxially mounted within said stationary chuck body member and bearing means therebetween providing free rotation of said rotatable chuck body member with respect to said stationary chuck body member, mandrel mounting means positioned in said chuck to receive one end of said mandrel including bearing means mounted between said rotatable chuck body member and said mandrel and locking means mounted on said stationary chuck body member engaging said mandrel for supporting said mandrel in stationary non-rotating manner, chuck jaw means movably mounted on said rotatable chuck body member and movable from a gripping position in which said jaw means engages said roll of material and a release position disengaged from said roll of material, fluid powered actuation means operatively connected to said chuck jaw means to move said jaw means between the release position and the gripping position, fluid pressure means including coupling means between the rotatable chuck body member and a source of fluid pressure and means providing a fluid passageway between said coupling means and said actuating means for controlling said actuating means, drive means connected to said rotatable chuck body member for rotating a roll of material on the machine mandrel by rotating said rotatable chuck body member and said chuck jaw means when the chuck jaw means is engaged with the roll of material mounted on the mandrel.

4. The slitting machine of claim 3 wherein said coupling means includes fluid distribution means formed in the surface of said stationary chuck body member adjacent said rotatable chuck body member, a fluid passageway in said stationary chuck body member extending between a source of fluid and said fluid pressure distribution means, a fluid passageway in said rotatable chuck body member having one end coupled to said actuation means and the opposite end positioned to receive fluid from said fluid distribution means so that fluid supplied to the fluid passageway in the stationary chuck body member flows into said fluid distribution means and into said fluid passageway in said rotatable chuck body member to control said actuation means.

5. The slitting machine of claim 4 wherein said roll of material has a hollow central core and said chuck jaws engage the outer surface of said central core when in the gripping position.

6. The slitting machine of claim 4 wherein said roll of material has a hollow central core and said chuck jaws engage the inner surface of said central core when in the gripping position.

7. The slitting machine of claim 3 wherein said removable mandrel includes a material mounting section sized to receive and support said roll of material and a mandrel mounting section sized to be secured and supported in said mounting means so that mandrels can be readily interchanged in said slitting machine for supporting rolls of materials of various sizes.

8. The slitting machine of claim 7 wherein said removable mandrel further includes locking and orientation means on said mandrel mounting section for axially retaining and orienting said mandrel in said chuck.

9. The slitting machine of claim 8 wherein said stationary chuck body member has orientation means positioned thereon to cooperate with the orientation means on said mandrel to orient said removable mandrel in said slitting machine.

10. The slitting machine of claim 3 wherein said coupling means includes fluid distribution means formed in one of the adjacent surfaces of said rotatable and stationary chuck body members providing fluid flow between the rotatable and stationary chuck body members.

11. In a slitting machine for making radial cuts in a roll of material as said roll is rotated about is axis, the improvement comprising a fluid actuated chuck and removable mandrel, said chuck gripping said roll of material and said mandrel supporting said roll of material as it is rotated, said chuck including a stationary chuck body member mounted in the frame of said machine coaxially with the location of said mandrel, a rotatable chuck body member coaxially mounted with said stationary chuck body member and bearing means therebetween providing free rotation of said rotatable chuck body member with respect to said stationary chuck body member, mandrel mounting means positioned in said chuck to receive one end of said mandrel including complementary locating and locking means on said mandrel and said stationary member for supporting said mandrel in a stationary manner, chuck jaw means mounted on said rotatable chuck body member for movement between a gripping position in which said jaws engage said roll of material and a release position disengaged from said roll of material, fluid power actuation means operatively connected to said jaw means to move said chuck jaw means between the release position and the gripping position, fluid pressure means having multiple fluid paths for controlling said actuating means including for each of the fluid paths coupling means between said rotatable chuck body member and said stationary chuck body member, means providing a fluid passageway between said coupling means through said stationary chuck body member to a source of fluid pressure and means providing a fluid passageway between said coupling means and through said rotatable chuck body member to said actuating means, drive means connected to said rotatable chuck body means for rotating a roll of material on the machine mandrel by rotating said rotatable chuck body member and said chuck jaw means when said chuck jaw means are engaged with the roll of material mounted on the mandrel.

* * * * *